US007684713B2

(12) United States Patent
Terayama et al.

(10) Patent No.: US 7,684,713 B2
(45) Date of Patent: Mar. 23, 2010

(54) PHASE CONTROL APPARATUS AND OPTICAL DQPSK RECEIVER

(75) Inventors: Yoshikazu Terayama, Kawasaki (JP); Noriaki Mizuguchi, Kawasaki (JP); Eiji Ishikawa, Kawasaki (JP); Takashi Toyomaki, Kawasaki (JP); Kenichi Kaburagi, Kawasaki (JP); Takeshi Hoshida, Kawasaki (JP); Jens Rasmussen, Kawasaki (JP); Akihiko Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 649 days.

(21) Appl. No.: 11/593,591

(22) Filed: Nov. 7, 2006

(65) Prior Publication Data

US 2007/0292140 A1 Dec. 20, 2007

(30) Foreign Application Priority Data

Jun. 15, 2006 (JP) ............................ 2006-165841

(51) Int. Cl.
*H04B 10/00* (2006.01)
(52) U.S. Cl. .................. 398/208; 398/203; 398/205; 398/206; 398/207; 398/209; 398/212; 398/214; 398/162; 398/155; 398/161; 398/77
(58) Field of Classification Search ................ 398/203, 398/205, 206, 207, 209, 212, 213, 214, 162, 398/155, 161, 77
See application file for complete search history.

(56) References Cited

U.S. PATENT DOCUMENTS

| 6,097,768 | A * | 8/2000 | Janesch et al. ............ 375/330 |
| 6,590,860 | B1 * | 7/2003 | Sakoda et al. ............ 370/203 |
| 7,389,055 | B1 * | 6/2008 | Rickard et al. ............ 398/206 |
| 2001/0031024 | A1 * | 10/2001 | Petersen et al. ............ 375/335 |

(Continued)

FOREIGN PATENT DOCUMENTS

JP 2004-516743 6/2004

(Continued)

OTHER PUBLICATIONS

F. Morichetti et al., "Integrated Optical Receiver for RZ-DQPSK Transmission Systems", Optical Fiber Communication Conference, Feb. 26, 2004, pp. 417-419.

(Continued)

*Primary Examiner*—Ken N Vanderpuye
*Assistant Examiner*—Amine Benlagsir
(74) *Attorney, Agent, or Firm*—Staas & Halsey LLP

(57) ABSTRACT

A calculation processing unit controls temperature of a Peltier device based on a slope of a waveform obtained by subtracting a waveform of a B-arm monitoring signal from a waveform of an A-arm monitoring signal and a value obtained by subtracting a value B of the B-arm monitoring signal from a value A of the A-arm monitoring signal. Similarly, the calculation processing unit controls a phase of the A-arm and a phase of the B-arm. An A-arm side micro-controller controls temperature of an A-arm side heater 22 based on the value of the A-arm monitoring signal, and controls the phase of the A-arm. A B-arm side micro-controller controls temperature of a B-arm side heater based on the value B of the B-arm monitoring signal, and controls the phase of the B-arm.

15 Claims, 13 Drawing Sheets

U.S. PATENT DOCUMENTS

| | | | |
|---|---|---|---|
| 2004/0081470 A1* | 4/2004 | Griffin | 398/188 |
| 2004/0141222 A1* | 7/2004 | Miyazaki et al. | 359/237 |
| 2005/0088659 A1 | 4/2005 | Schlenk et al. | |
| 2005/0111855 A1* | 5/2005 | Bissessur | 398/188 |
| 2005/0286911 A1* | 12/2005 | Doerr et al. | 398/214 |
| 2006/0067703 A1* | 3/2006 | Haunstein et al. | 398/161 |

FOREIGN PATENT DOCUMENTS

| | | |
|---|---|---|
| WO | WO 02/51041 A2 | 6/2002 |
| WO | 03/063515 | 7/2003 |
| WO | WO 03/063515 A2 | 7/2003 |
| WO | WO 03063515 A2 * | 7/2003 |

OTHER PUBLICATIONS

I. Morita et al., "Merits of DQPSK for Ultrahigh Capacity Transmission", IEEE Annual Meeting Conference Proceedings, Oct. 23, 2007, pp. 487-488.

Extended European Search Report issued in corresponding European Patent Application No. 06123935.6, on Sep. 13, 2007.

* cited by examiner

CASE 1

CASE 2

PHASE CONTROL APPARATUS AND OPTICAL DQPSK RECEIVER

CROSS-REFERENCE TO RELATED APPLICATIONS

This application is based upon and claims the benefit of priority from the prior Japanese Patent Application No. 2006-165841, filed on Jun. 15, 2006, the entire contents of which are incorporated herein by reference.

BACKGROUND OF THE INVENTION

1. Field of the Invention

The present invention relates to a phase control apparatus to demodulate a signal light beam that is differential-quadrature-phase-shift-keying (DQPSK)-modulated and an optical DQPSK receiver.

2. Description of the Related Art

Conventionally, a receiver having the configuration as shown in FIG. 16 is known as an optical DQPSK receiver 10 that receives a signal light beam that is differential-quadrature-phase-shift-keying-modulated (for example, International Patent Application Publication No. 2004-516743). In the optical receiver 10, a DQPSK signal input is branched into two. The branched light beams are provided respectively to delay interferometers 11 and 12. Each of the delay interferometers 11 and 12 is adapted to differ the optical path lengths of two optical waveguides from each other that are Mach-Zehnder-type optical waveguides formed on, for example, a silica substrate or an indium phosphide substrate, thereby generating a relative delay time difference corresponding to at least an integral multiple of one symbol that is DQPSK-modulated between light beams propagating the optical waveguides.

The interference operating point of the delay interferometer 11 is defined to be $\pi/4$ by a delaying unit 13 formed on one of the optical waveguides. The interference operating point of the delay interferometer 12 is defined to be $-\pi/4$ by a delaying unit 14 formed on another one of the optical waveguides. Complementary two outputs that are output from a coupler at the output-stage of the delay interferometer 11 are received by a differential optical receiving circuit 15 including a pair of optical detectors and an amplifier. The differential optical receiving circuit 15 demodulates an electric signal A corresponding to a signal D1 input into a transmitter not shown.

Similarly to the above, complementary two outputs that are output from a coupler at the output-stage of the delay interferometer 12 are also received by a differential optical receiving circuit 16 including a pair of optical detectors and an amplifier. The differential optical receiving circuit 16 demodulates an electric signal B corresponding to a signal D2 input into a transmitter not shown. The electric signals A and B that have been demodulated are newly created as more stable electric signals respectively by clock data recovery (CDR) circuits 17 and 18. Synchronization process of frames and creation of frames such as synchronous digital hierarchy (SDH), synchronous optical network (SONET), or oracle technology network (OTN) and error correction are executed by a framer circuit/forward error correction (FEC) decoding circuit 19.

For such an optical DQPSK receiver, it is important that optical phase differences between the optical waveguides of the delay interferometers 11 and 12 are respectively set accurately to be $\pi/4$ and $-\pi/4$. Such an optical DQPSK receiver is known that a heater is provided to each of one optical waveguide of one delay interferometer and one optical waveguide of the other delay interferometer, to adjust independently the temperature of each of the heaters, thereby adjusting the optical phase difference between the optical waveguides of the delay interferometers 11 and 12 (for example, International Patent Application Laid-Open Publication No. 03/063515).

When an optical DQPSK receiver is actually used, at the time of, for example, starting up of the receiver, switching of optical signals, or fluctuation of external conditions such as the environmental temperature, the optical phase difference between the optical waveguides of each of the delay interferometers needs to be adjusted to a desired state in a short time. However, in International Patent Application Publication No. 2004-516743, it is not disclosed that how the optical phase difference between the optical waveguides of each of the delay interferometers is controlled. In International Patent Application Laid-Open Publication No. 03/063515, it is not disclosed that how the temperature of each heater is controlled.

Therefore, in the above conventional receivers, the adjustment of the optical phase difference can not be completed in a short time because the optical phase difference and the temperature of each of the heaters are adjusted in a trial-and-error manner. That is, the optical receivers disclosed in the above patent literatures are still in development stages and are not suitable for practical use. The optical receiver disclosed in International Patent Application Laid-Open Publication No. 03/063515 has a problem that the optical phase difference between the optical waveguides can not be fully controlled because the range of temperature adjustment by a heater is narrow.

SUMMARY OF THE INVENTION

It is an object of the present invention to at least solve the above problems in the present invention.

A phase control apparatus according to one aspect of the present invention includes a first delay interferometer including a first optical waveguide; a second optical waveguide that propagates an optical signal having a phase difference of approximately $\pi/4$ from a phase of an optical signal that is propagated through the first optical waveguide, wherein the first optical waveguide has a length longer than the second optical waveguide by a length that provides a delay time difference corresponding to at least an integral multiple of one symbol of a differential-quadrature-phase-shift-keying (DQPSK) modulating signal, and an optical signal input to the first delay interferometer is branched into two to be input to the first optical waveguide and the second optical waveguide; a second delay interferometer including a third optical waveguide; a fourth optical waveguide that propagates an optical signal having a phase difference of about $-\pi/4$ from a phase of an optical signal that is propagated through the third optical waveguide, wherein the third optical waveguide has a length longer than the fourth optical waveguide by a length that provides a delay time difference corresponding to at least an integral multiple of one symbol of a DQPSK modulating signal, and the optical signal input to the second delay interferometer is branched into two to be input to the third optical waveguide and the fourth optical waveguide; a first photoelectric converting unit that converts the optical signal that propagates through the first optical waveguide and the optical signal that propagates through the second optical waveguide into an electric signal; a second photoelectric converting unit that converts the optical signal that propagates through the third optical waveguide and the optical signal that propagates through the fourth optical waveguide into an electric signal; a first data reproducing unit that determines logic of the electric signals produced by the first photoelectric converting unit to reproduce data of the optical signal that propagates through the first delay interferometer; a second data reproducing unit that determines logic of the electric signals produced by the second photoelectric converting unit to reproduce data of the optical signal that propagates through the second delay interferometer; a first monitoring signal detecting unit that detects a first monitoring signal formed by multiplying an input signal to the first data reproducing unit and an output signal of the second data reproducing unit; a second monitoring signal detecting unit that detects a second monitoring signal formed by multiplying an input signal to the second data reproducing unit and an output signal of the first data reproducing unit; a first temperature changing unit that changes temperature of the first delay interferometer and the second delay interferometer; a second temperature changing unit that changes temperature of the second optical waveguide; a third temperature changing unit that changes temperature of the fourth optical waveguide; a first temperature control unit that controls temperature of the first temperature changing unit based on a value of the first monitoring signal and the second monitoring signal; a second temperature control unit that controls temperature of the second temperature changing unit based on a value of the first monitoring signal; and a third temperature control unit that controls temperature of the third temperature changing unit based on a value of the second monitoring signal.

An optical DQPSK receiver according to another aspect of the present invention includes the phase control apparatus according to the above aspect.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be described in detail below with reference to the accompanying drawings.

Figure 1:
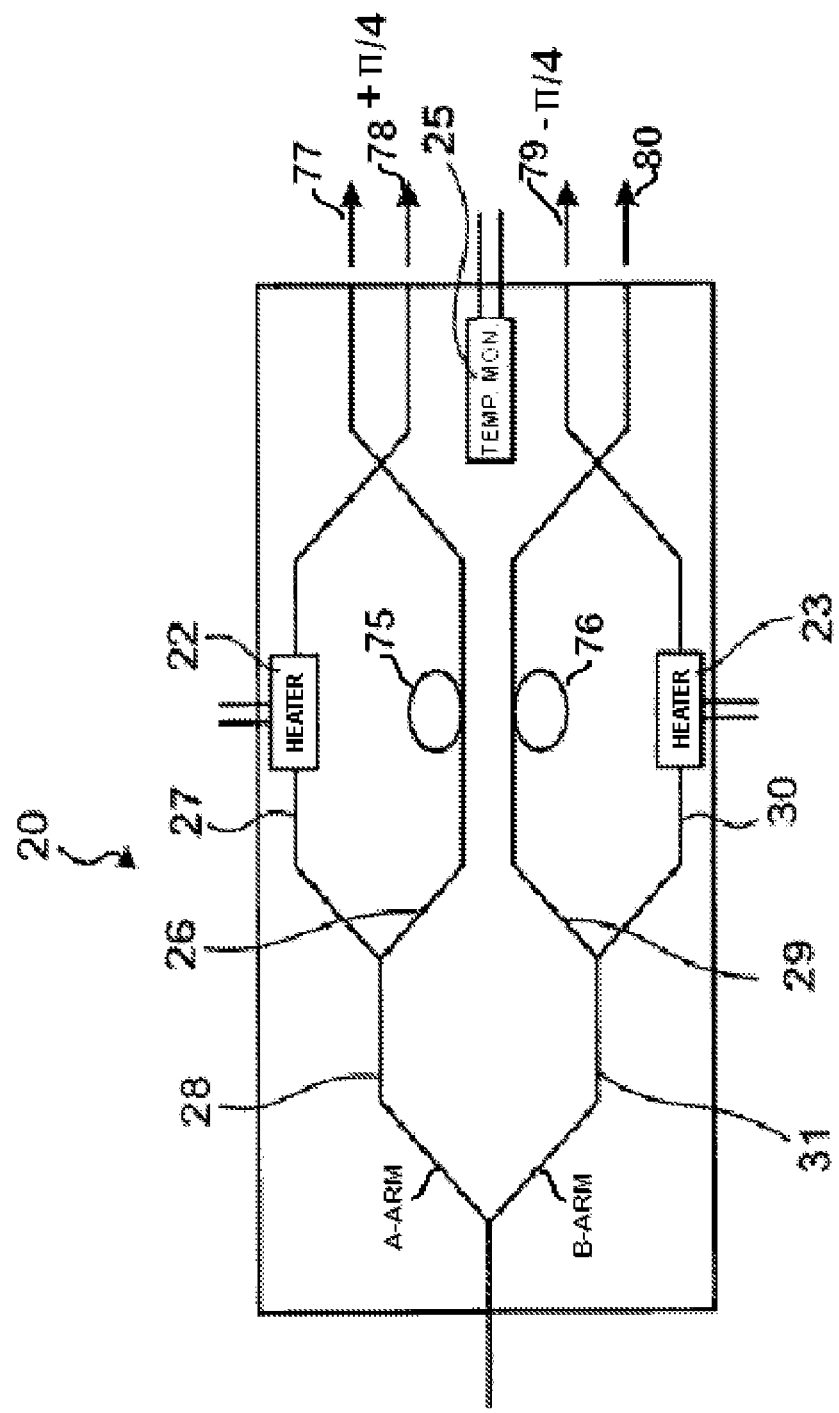
FIG. 1 is a plan view, partially schematic, of a planar light wave circuit including an optical phase control unit according to an embodiment of the present invention.
Figure 2:
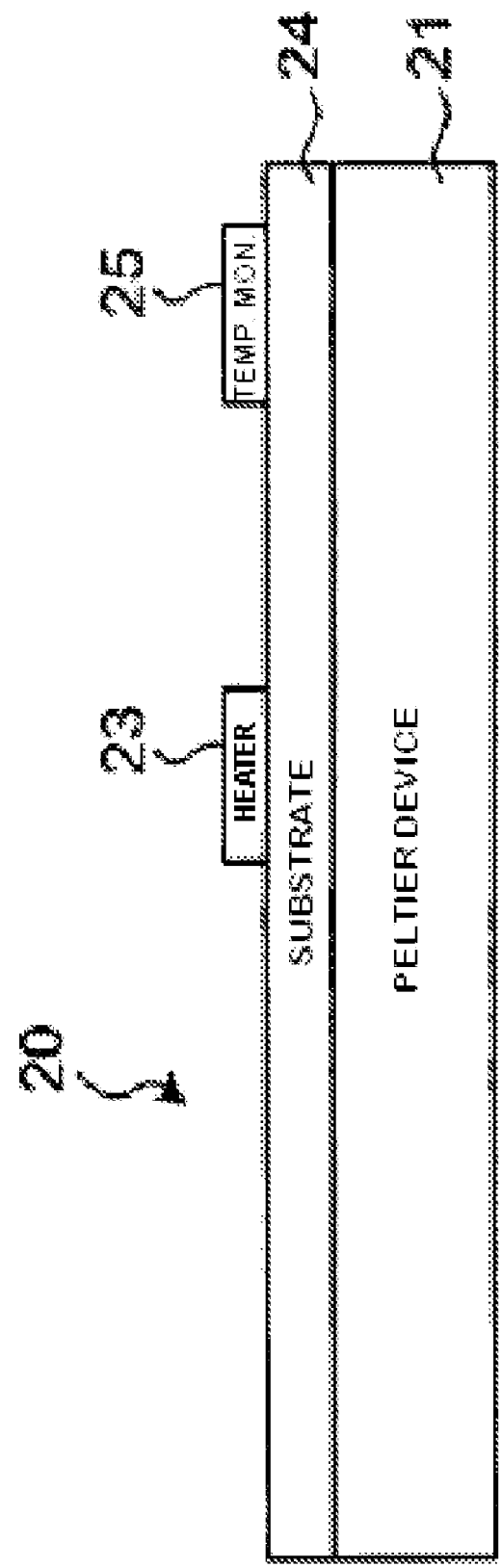
FIG. 2 is a side view of the planar light wave circuit.

FIGS. 1 and 2 are schematics of a PLC according to an embodiment of the present invention. As shown in FIGS. 1 and 2, a PLC 20 includes a Peltier device 21 that is a first temperature changing unit, a first heater 22 that is a second temperature changing unit, and a second heater 23 that is a third temperature changing unit. The Peltier device 21 is provided beneath a substrate 24, varies the temperature of the entire PLC, and maintains the temperature of the PLC 20 at a predetermined temperature by feedback-controlling of the PLC temperature using a temperature monitor 25.

The first heater 22 varies the temperature of a second optical waveguide 27 in a first delay interferometer 28 including a first optical waveguide 26 and the second optical waveguide 27 that are formed on the PLC 20. The first optical waveguide 26 is longer than the second optical waveguide 27 by a length 75 that can provide a delay time difference that is at least an integral multiple of one symbol of a DQPSK modulating signal. An optical signal 78 that propagates through the second optical waveguide 27 generates a phase difference of approximately $+\pi/4$ against an optical signal 77 that propagates through the first optical waveguide 26. Hereinafter, the first delay interferometer side is referred to as "A-arm". Those skilled in the art can easily fabricate the integral multiple though the integral multiple depends on the length of a wavelength when the integral multiple is about ten times or smaller.

The second heater 23 varies the temperature of a fourth optical waveguide 30 in a second delay interferometer 31 including a third optical waveguide 29 and the fourth optical waveguide 30 that are formed on the PLC 20. The third optical waveguide 29 is longer than the fourth optical waveguide 30 by a length 76 that can provide a delay time difference that is at least an integral multiple of one symbol of the DQPSK modulating signal. An optical signal 79 that propagates through the fourth optical waveguide 30 generates a phase difference of approximately $-\pi/4$ against an optical signal 80 that propagates through the third optical waveguide 29. Hereinafter, the second delay interferometer side is referred to as "B-arm".

As above, the PLC 20 is manufactured such that the phase difference between the A-arm and the B-arm is approximately $\pi/2$ by the phase difference of approximately $+\pi/4$ of the A-arm and the phase difference of approximately $-\pi/4$ of the B-arm. However, an error is generated to some extent in the phase difference of approximately $\pi/2$ due to the manufacturing errors of the PLC 20 and the wavelength and frequency of the light that is received. In general, the refractive index of an optical waveguide varies according to change in temperature. Therefore, in the PLC 20 having the above configuration, the error generated in the phase difference of about π/2 can be eliminated and the phase difference between the A-arm and the B-arm can be made approximately π/2 by controlling the temperature of each of the Peltier device 21, the first heater 22, and the second heater 23.

Figure 3:
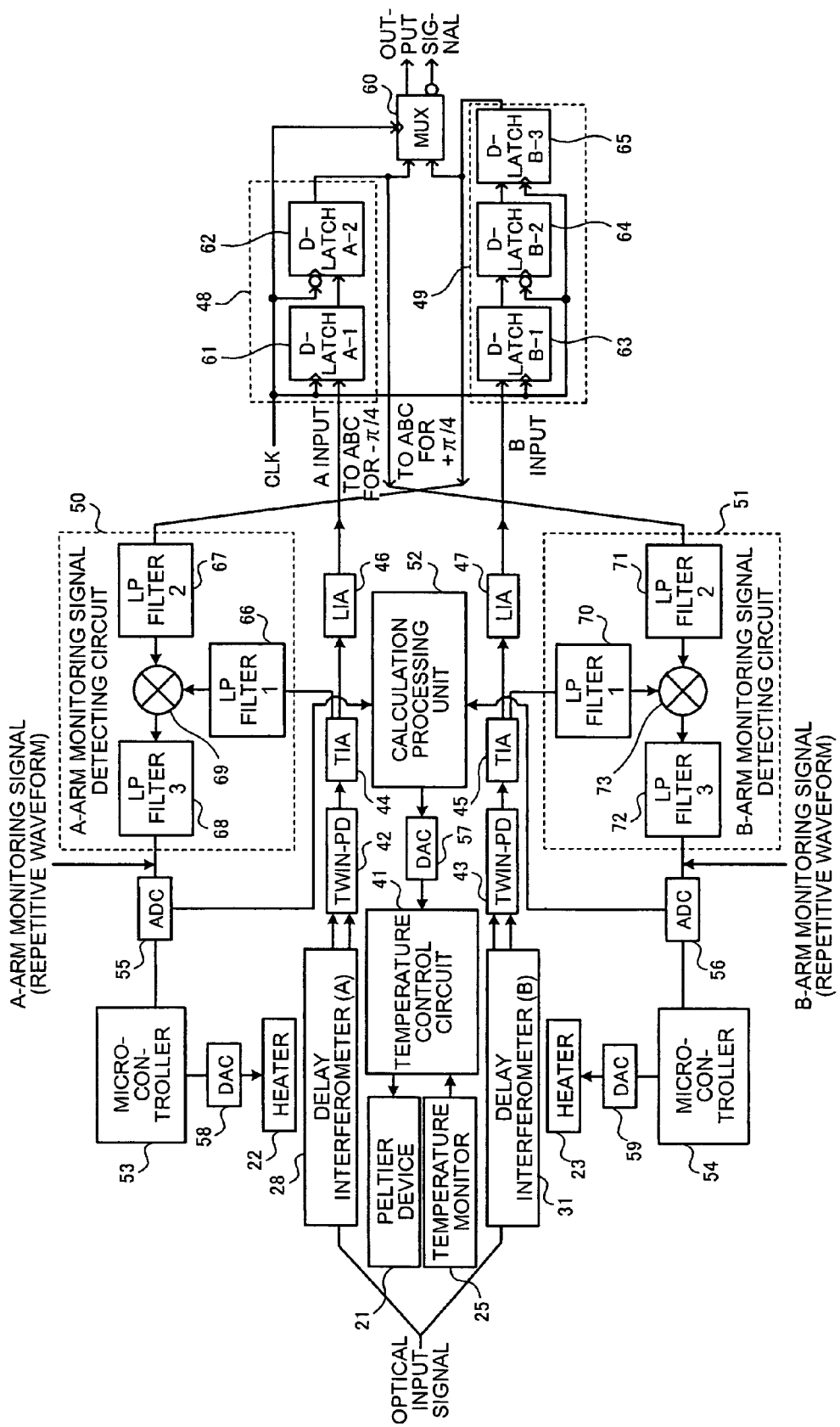
FIG. 3 is a block diagram of a phase control apparatus according to the embodiment.

FIG. 3 is a block diagram of a phase control apparatus according to the embodiment. A delay interferometer (A) and a delay interferometer (B) are the first delay interferometer 28 and the second delay interferometer 31 respectively. A heater disposed beside the first delay interferometer 28 and a heater disposed beside the second delay interferometer 31 are the first heater 22 and the second heater 23 respectively. The Peltier device 21 and the temperature monitor 25 are connected to a temperature control circuit 41.

As shown in FIG. 3, the phase control apparatus includes the temperature control circuit 41, A-arm side twin photodiode (Twin-PD) 42 that forms a first photoelectric converting unit, B-arm side twin photodiode (Twin-PD) 43 that forms a second photoelectric converting unit, an A-arm side trans-impedance amplifier (TIA) 44, a B-arm side trans-impedance amplifier (TIA) 45, an A-arm side limiter amplifier (LIA) 46, and a B-arm side limiter amplifier (LIA) 47. The phase control apparatus includes an A-arm side data recovering circuit 48 that is a first data reproducing unit, a B-arm side data recovering circuit 49 that is a second data reproducing unit, an A-arm monitoring signal detecting circuit 50 that is a first monitoring signal detecting unit, and an B-arm monitoring signal detecting circuit 51 that is a second monitoring signal detecting unit.

The phase control apparatus includes a calculation processing unit 52 that is a first temperature control unit, an A-arm side micro-controller 53 that is a second temperature control unit, a B-arm side micro-controller 54 that is a third temperature control unit, analog/digital converters (ADCs) 55 and 56, and digital/analog converters (DAC) 57, 58, and 59. An optical DQPSK receiver using this phase control apparatus includes a multiplexer (MUX) 60.

An input DQPSK signal is branched and guided to the first delay interferometer 28 provided on the A-arm and the second delay interferometer 31 provided on the B-arm. The A-arm side twin PD 42 and the B-arm side twin PD 43 are generate electric signals corresponding respectively to an output light of the first delay interferometer 28 and an output light of the second delay interferometer 31. The A-arm side trans-impedance amplifier 44 and the B-arm side trans-impedance amplifier 45 convert current signals produced by the A-arm side twin PD 42 and the B-arm side twin PD 43 into voltage signals.

The output signal of the A-arm side trans-impedance amplifier 44 is sent to the A-arm side data recovering circuit 48 through the A-arm side limiter amplifier 46 and is also sent to the A-arm monitoring signal detecting circuit 50. The A-arm side data recovering circuit 48 includes, for example, two D-flip-flop circuits 61 and 62 and executes logical judgment of the output signal of the A-arm side limiter amplifier 46 utilizing a clock (CLK) recovered from the received signal. The output signal of the A-arm side data recovering circuit 48 is sent to the multiplexer 60 and the B-arm monitoring signal detecting circuit 51.

The output signal of the B-arm side trans-impedance amplifier 45 is sent to the B-arm side data recovering circuit 49 through the B-arm side limiter amplifier 47 and is also sent to the B-arm monitoring signal detecting circuit 51. The B-arm side data recovering circuit 49 includes, for example, three D-flip-flop circuits 63, 64, and 65 and executes logical judgment of the output signal of the B-arm side limiter amplifier 47 utilizing a clock (CLK) recovered from the received signal. The output signal of the B-arm side data recovering circuit 49 is sent to the multiplexer 60 and the A-arm monitoring signal detecting circuit 50. The multiplexer 60 combines the output signal of the A-arm side data recovering circuit 48 and the output signal of the B-arm side data recovering circuit 49 and outputs the combined signal as a received data.

The A-arm monitoring signal detecting circuit 50 includes low-pass filters 66, 67, and 68 and a mixer 69. The output signal of the A-arm side trans-impedance amplifier 44 is input into the mixer 69 through the low-pass filter 66. The output signal of the B-arm side data recovering circuit 49 is input into the mixer 69 through the low-pass filter 67. The low-pass filters 66 and 67 are inserted for matching the group delays of the output signal of the A-arm side trans-impedance amplifier 44 and the output signal of the B-arm side data recovering circuit 49.

The mixer 69 multiplies the output signal of the low-pass filter 66 and the output signal of the low-pass filter 67. The output signal of the mixer 69, after a high frequency component is removed therefrom by the low-pass filter 68, is converted into digital data by the analog/digital converter 55 as an A-arm monitoring signal having a repetitive waveform. The A-arm monitoring signal digital-converted by the analog/digital converter 55 is sent to the calculation processing unit 52 and the A-arm side micro-controller 53.

The A-arm monitoring signal detecting circuit 51 includes low-pass filters 70, 71, and 72 and a mixer 73. The output signal of the B-arm side trans-impedance amplifier 45 is input into the mixer 73 through the low-pass filter 70. The output signal of the A-arm side data recovering circuit 48 is input into the mixer 73 through the low-pass filter 71. The low-pass filters 70 and 71 are inserted for matching the group delays of the output signal of the B-arm side trans-impedance amplifier 45 and the output signal of the A-arm side data recovering circuit 48.

The mixer 73 multiplies the output signal of the low-pass filter 70 and the output signal of the low-pass filter 71. The output signal of the mixer 73, after a high frequency component is removed therefrom by the low-pass filter 72, is converted into digital data by the analog/digital converter 56 as a B-arm monitoring signal having a repetitive waveform. The B-arm monitoring signal digital-converted by the analog/digital converter 56 is sent to the calculation processing unit 52 and the B-arm side micro-controller 54.

The calculation processing unit 52 calculates [|A−B|/Pin=a mixer-output normalized value] to obtain the mixer-output normalized value, using a value (hereinafter, "A") of the A-arm monitoring signal of the digital signal output from the analog/digital converter 55, a value (hereinafter, "B") of the B-arm monitoring signal of the digital signal output from the analog/digital converter 56, and an input level (hereinafter, "Pin") of the optical signal to the A-arm side twin PD 42 or the B-arm side twin PD 43. The calculation processing unit 52 obtains the slope of a waveform obtained by subtracting the waveform of the B-arm monitoring signal output from the analog/digital converter 56 from the waveform of the A-arm monitoring signal output from the analog/digital converter 55.

The calculation processing unit 52 outputs a Peltier control signal to control the temperature of the Peltier device 21 based on the mixer-output normalized value and the slope of [the waveform of the A-arm monitoring signal−the waveform of the B-arm monitoring signal]. At this time, a relational expression and an approximation are obtained in advance that show the relation among the mixer-output normalized value, the slope of [the waveform of the A-arm monitoring signal–the waveform of the B-arm monitoring signal], and the Peltier control signal. Therefore, an appropriate Peltier control signal is obtained by calculation of the relational expression and the approximation by the calculation processing unit 52.

Alternatively, instead of the relational expression and the approximation, a table may be prepared showing the relation among the mixer-output normalized value, the slope, and the Peltier control signal, and an appropriate Peltier control signal may be obtained by referring to the table by the calculation processing unit 52. The relation between the temperature control of the Peltier device 21 by the calculation processing unit 52 and the phase control of the A-arm and B-arm will be described later.

The Peltier control signal output from the calculation processing unit 52 is converted by the digital/analog converter 57 into an analog signal and is provided to the temperature control circuit 41. The temperature control circuit 41 controls the temperature of the Peltier device 21 based on the Peltier control signal output from the digital/analog converter 57 and feedback-controls based on the detected temperature of the PLC 20 (see FIG. 1) by the temperature monitor 25 such that the temperature of the PLC 20 is maintained at a predetermined temperature. At this time, the temperature control of the Peltier device 21 may be executed by proportional-integral-derivative (PID) control.

The A-arm side micro-controller 53 outputs a heater control signal to control the temperature of the first heater 22 such that the value A of the A-arm monitoring signal output from the analog/digital converter 55 converges to zero. The heater control signal output from the A-arm side micro-controller 53 is converted by the digital/analog converter 58 into an analog signal and is provided to the first heater 22. The temperature of the first heater 22 is controlled by the heater control signal output from the digital/analog converter 58. At this time, the temperature control of the first heater 22 may be executed by PID control.

The B-arm side micro-controller 54 outputs a heater control signal to control the temperature of the second heater 23 such that the value B of the B-arm monitoring signal output from the analog/digital converter 55 converges to zero. The heater control signal output from the B-arm side micro-controller 54 is converted by the digital/analog converter 59 into an analog signal and is provided to the second heater 23. The temperature of the second heater 23 is controlled by the heater control signal output from the digital/analog converter 59. At this time, the temperature control of the second heater 23 may be executed by PID control. The relation between the temperature control of each of the first heater 22 and the second heater 23 respectively by the A-arm side micro-controller 53 and the B-arm side micro-controller 54, and the phase control of each of the A-arm and the B-arm will be described later.

Figure 4:
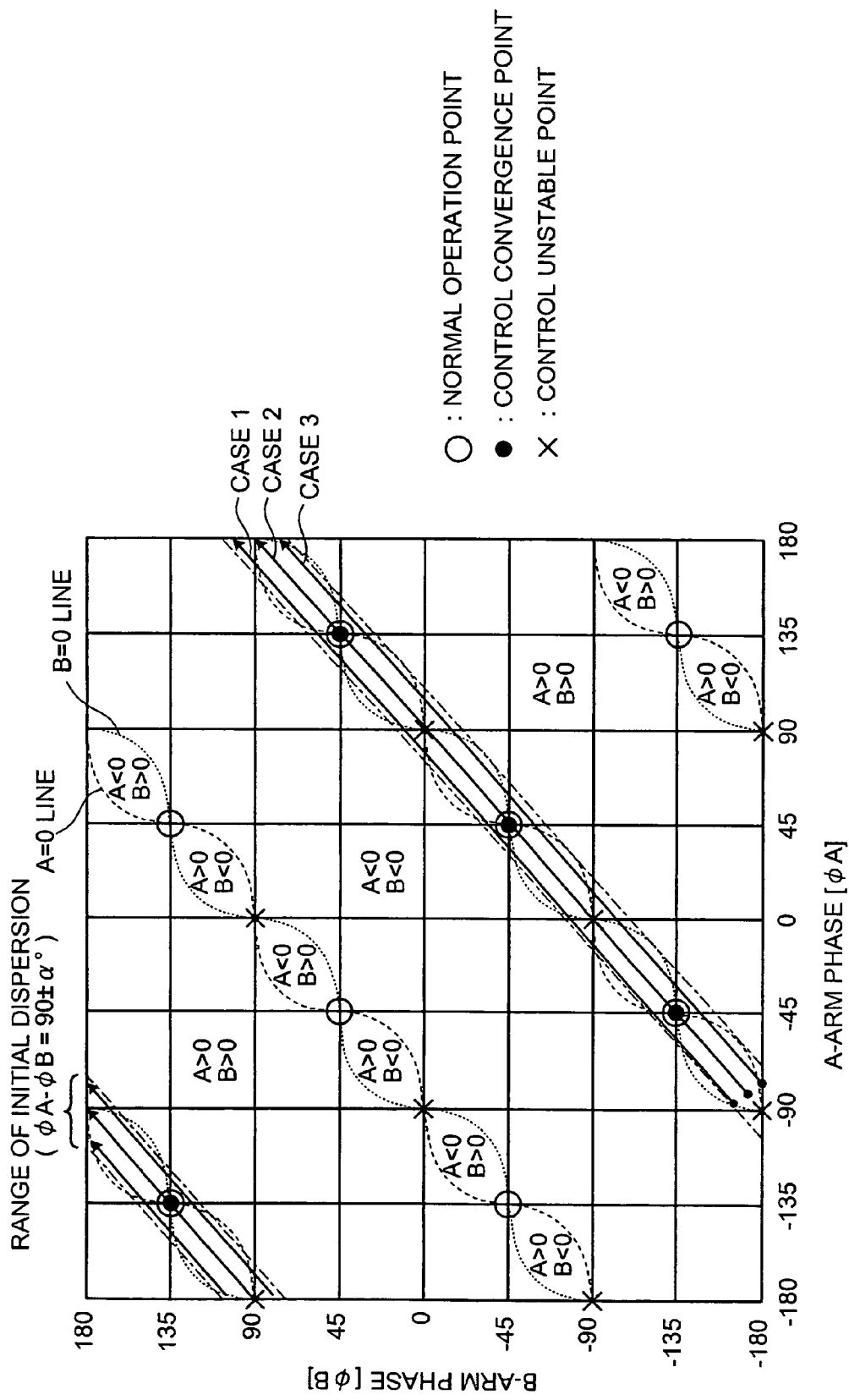
FIG. 4 is a chart for explaining a relation between temperature of a Peltier device and phase of each of an A-arm and a B-arm.

Relation between the temperature control of the Peltier device 21 by the calculation processing unit 52 and the phase control of each of the A-arm and the B-arm will be described. FIG. 4 is a chart for explaining the variation of the phase of each of the A-arm and the B-arm when the temperature of the Peltier device is increased. FIG. 4 indicates the state where both of the A-arm side and the B-arm side heaters 22 and 23 are turned off.

The axis of abscissa and the axis of ordinate respectively represent the phase of the A-arm (hereinafter, "φA") and the phase of the B-arm (hereinafter, "φB"). White circles, black circles, and crosses respectively indicate normal operating points, control convergence points, and control unstable points. Therefore, the above phase control apparatus needs to control the phase φA and the phase φB such that those phases avoid the control unstable points and converge to the control convergence points.

As shown in FIG. 4, "A>0", "A<0", "B>0", and "B<0" respectively indicate that the value A of the A-arm monitoring signal is positive, the value A of the A-arm monitoring signal is negative, the value B of the B-arm monitoring signal is positive, and the value B of the B-arm monitoring signal is positive. Curves depicted by dashed lines and dotted lines show respectively that the value A of the A-arm monitoring signal is zero and the value B of the B-arm monitoring signal is zero. A belt-shaped region partitioned by chain lines that faces each other sandwiching the control convergence points represents a range of the initial dispersion (90±α°) of [φA−φB]. These remarks are common in FIGS. 4, 8 and 9.

The Peltier device 21 varies the temperature of each of the first delay interferometer 28 on the A-arm side and the second delay interferometer 31 on the B-arm side simultaneously by the same amount of temperature. That is, as shown in FIG. 4, when the temperature of each of the first delay interferometer 28 and the second delay interferometer 31 is increased by increasing the current of the Peltier device 21, the phase φA of the A-arm and the phase φB of the B-arm both varies by a same amount of phase. Therefore, as arrows as case 1, case 2, and case 3 shown in the figure, the phases φA and φB shift being accompanied by the initial dispersion of [φA−φB]. Case 1, case 2, and case 3 are cases where the difference between the phase φA and the phase φB at the time of starting up of the phase control apparatus is smaller than π/2, equals to π/2, and is larger than π/2, respectively. In the embodiment, the time of starting up includes the initial starting up of the phase control apparatus and also the time at the time when the wavelength or the frequency of the received light is switched.

In case 2, the phase φA and the phase φB can be caused to converge to the control convergence points only by controlling the temperature of the Peltier device 21. In case 1 and case 3, control to cause the phase φA and the phase φB shift to a point close to the control convergence points using the temperature control of the Peltier device 21, and control to cause the phases to converge to the control convergence points by controlling the temperature of the heater 22 on the A-arm side and the temperature of the heater 23 on the B-arm side, are combined. In either case, it is necessary to control the phase φA and the phase φB such that the phases do not converge to the control unstable points.

To do so, the following procedure may be taken. For example, at the time of starting up of the phase control apparatus, when the phase φA and the phase φB are respectively within ranges of −45°(=−π/4) to 0°, and −135°(=−3π/4) to −90°(−π/2), the temperature of the Peltier device 21 is increased such that the phase φA and the phase φB are both advanced by, for example, 45°(=π/4). Therefore, the phases can avoid the control unstable points at which the phase φA is 0° and the phase φB is −90° (=−π/2).

Figure 5:
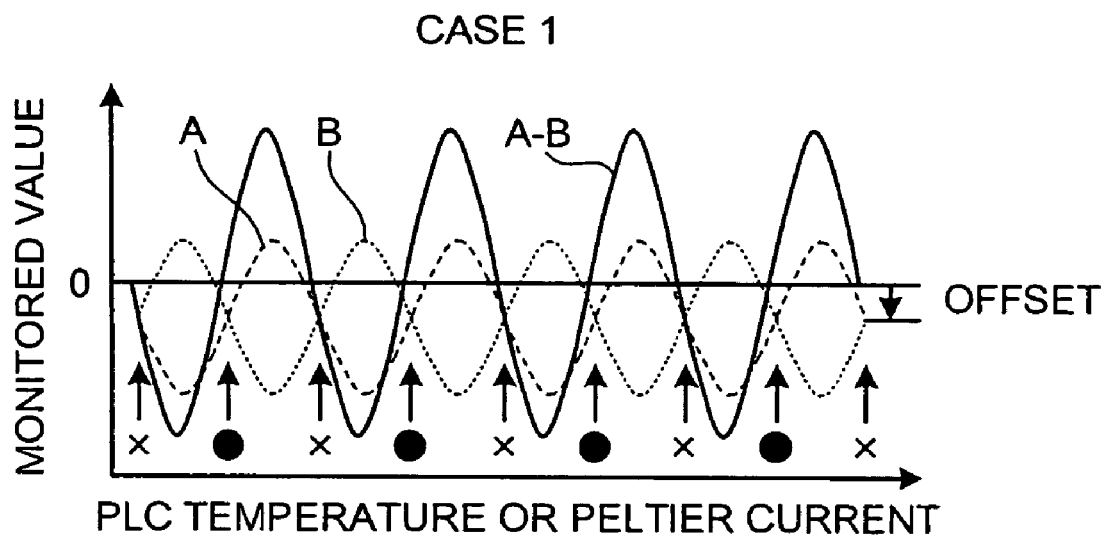
FIG. 5 is a chart for explaining a relation between temperature of a planar light wave circuit (PLC) or a Peltier current and a value of each of monitoring signals of the A-arm and the B-arm in case 1 shown in FIG. 4.
Figure 6:
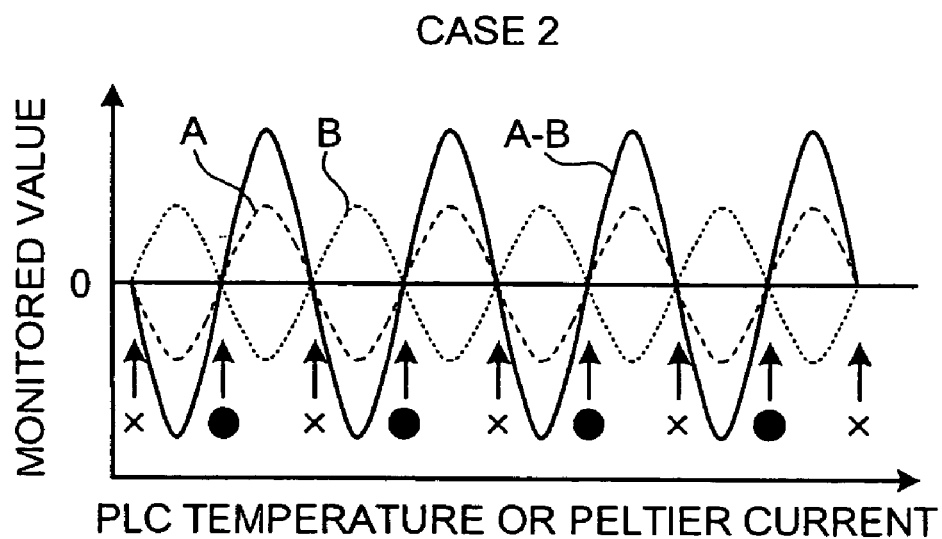
FIG. 6 is a chart for explaining a relation between temperature of the PLC or a Peltier current and a value of each of monitoring signals of the A-arm and the B-arm in case 2 shown in FIG. 4.
Figure 7:
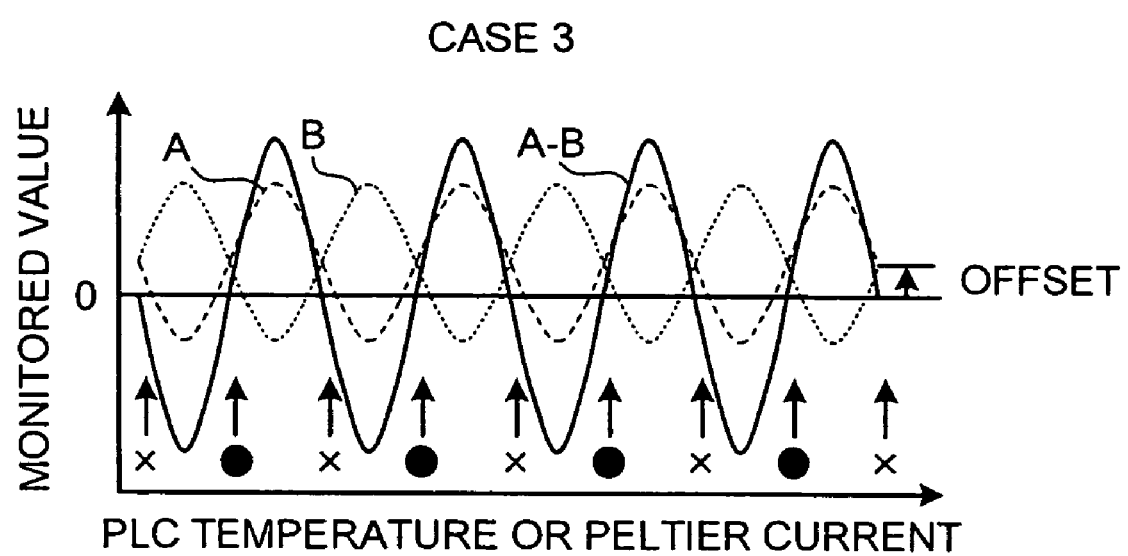
FIG. 7 is a chart for explaining a relation between temperature of the PLC or a Peltier current and a value of each of monitoring signals of the A-arm and the B-arm in case 3 shown in FIG. 4.

In the description of the above calculation processing unit 52, it has been described that the calculation processing unit 52 obtains the mixer-output normalized value and [the waveform of the A-arm monitoring signal−the waveform of the B-arm monitoring signal] and the reason thereof will be described. FIGS. 5, 6, and 7 are charts of the relations between the temperature of the PLC 20 (or the Peltier current) and the value of the monitoring signal of each of the A-arm and the B-arm respectively for case 1, case 2, and case 3 of FIG. 4. In these charts, dashed lines denoted by "A", dotted lines denoted by "B", and solid lines denoted by "A-B" respectively represent the value A of the A-arm monitoring signal, the value B of the B-arm monitoring signal, and the value obtained by subtracting the value B of the B-arm monitoring signal from the value A of the A-arm monitoring signal. Similarly to the chart shown in FIG. 4, the black circles and crosses respectively represent the control convergence points and the control unstable points.

As shown in FIGS. 5 and 7, in case 1 and case 3, the temperature of the PLC 20 (or the Peltier current) for the time when the value A of the A-arm monitoring signal and the value B of the B-arm monitoring signal are zero respectively, and the temperature of the PLC 20 (or the Peltier current) for the time when the value A of the A-arm monitoring signal and the value B of the B-arm monitoring signal are equal, differ from each other. That is, an offset is generated between the above two.

Therefore, the temperature of the Peltier device 21 can not be efficiently controlled when the value A of the A-arm monitoring signal and the value B of the B-arm monitoring signal are separately monitored. Therefore, by monitoring the value obtained by subtracting the value B of the B-arm monitoring signal from the value A of the A-arm monitoring signal, the temperature of the Peltier device 21 can be efficiently controlled because the temperature of the PLC 20 (or the Peltier current) at the time when the value obtained by the subtracting is zero coincides with the temperature of the PLC 20 (or the Peltier current) at the time when the value A of the A-arm monitoring signal and the value B of the B-arm monitoring signal are zero respectively.

The magnitude of the value obtained by subtracting the value B of the B-arm monitoring signal from the value A of the A-arm monitoring signal is related with how much the phase φA and the phase φB diverge from the control convergence points or the control unstable points. However, the value obtained by subtracting the value B of the B-arm monitoring signal from the value A of the A-arm monitoring signal varied by the input level Pin of the optical signal to the A-arm side twin PD 42 or the B-arm side twin PD 43. Therefore, influence of the magnitude of the input level Pin can be eliminated by obtaining the mixer-output normalized value. Therefore, how the phase φA and the phase φB diverge from the control convergence points or the control unstable points can be seen by using the mixer-output normalized value regardless of the magnitude of the input level Pin.

As obvious from the FIGS. 5 to 7, the slope of [the waveform of the A-arm monitoring signal−the waveform of the B-arm monitoring signal] is positive at the control convergence points and is negative at the control unstable points. Therefore, it can be seen that how much the temperature of the Peltier device 21 may be increased by using the value obtained by subtracting the value B of the B-arm monitoring signal from the value A of the A-arm monitoring signal, the mixer-output normalized value, and the slope of [the waveform of the A-arm monitoring signal−the waveform of the B-arm monitoring signal]. As an example, the phase φA and the phase φB may be controlled by increasing the temperature of the Peltier device 21 as the following (1) to (6).

(1) The case where the slope of [the waveform of the A-arm monitoring signal−the waveform of the B-arm monitoring signal] is negative and the value obtained by subtracting the value B of the B-arm monitoring signal from the value A of the A-arm monitoring signal is negative. The temperature of the Peltier device 21 is increased such that the phase φA and the phase φB are respectively advanced by an angle within a range of 22.5°(=π/8) to 450 (=π/4) corresponding to the mixer-output normalized value.

(2) The case where the slope of [the waveform of the A-arm monitoring signal−the waveform of the B-arm monitoring signal] is zero and the value obtained by subtracting the value B of the B-arm monitoring signal from the value A of the A-arm monitoring signal is negative. The temperature of the Peltier device 21 is increased such that the phase φA and the phase φB are respectively advanced by 22.5°(=π/8).

(3) The case where the slope of [the waveform of the A-arm monitoring signal−the waveform of the B-arm monitoring signal] is positive and the value obtained by subtracting the value B of the B-arm monitoring signal from the value A of the A-arm monitoring signal is negative. The temperature of the Peltier device 21 is increased such that the phase φA and the phase φB are respectively advanced by an angle within a range of 0° to 22.5°(=π/8) corresponding to the mixer-output normalized value.

(4) The case where the slope of [the waveform of the A-arm monitoring signal−the waveform of the B-arm monitoring signal] is positive and the value obtained by subtracting the value B of the B-arm monitoring signal from the value A of the A-arm monitoring signal is positive. The temperature of the Peltier device 21 is increased such that the phase φA and the phase φB are respectively advanced by an angle within a range of 67.5°(=3π/8) to 90°(=π/2) corresponding to the mixer-output normalized value.

(5) The case where the slope of [the waveform of the A-arm monitoring signal−the waveform of the B-arm monitoring signal] is zero and the value obtained by subtracting the value B of the B-arm monitoring signal from the value A of the A-arm monitoring signal is positive. The temperature of the Peltier device 21 is increased such that the phase φA and the phase φB are respectively advanced by 67.5°(=3π/8).

(6) The case where the slope of [the waveform of the A-arm monitoring signal−the waveform of the B-arm monitoring signal] is negative and the value obtained by subtracting the value B of the B-arm monitoring signal from the value A of the A-arm monitoring signal is positive. The temperature of the Peltier device 21 is increased such that the phase φA and the phase φB are respectively advanced by an angle within a range of 45°(=π/4) to 67.5°(=3π/8) corresponding to the mixer-output normalized value.

Figure 8:
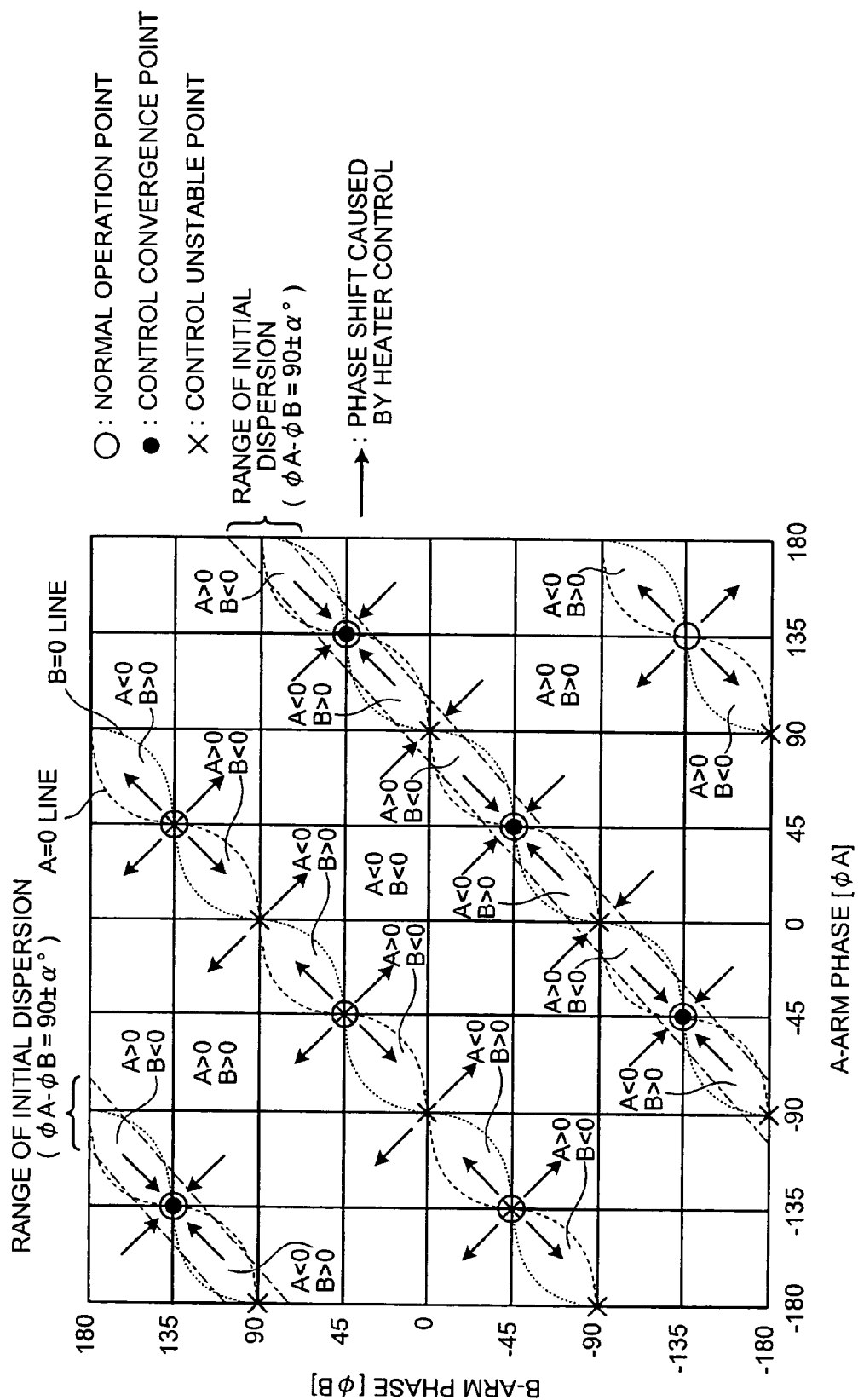
FIG. 8 is a chart for explaining a relation between temperature of a heater and phases of the A-arm and the B-arm.
Figure 9:
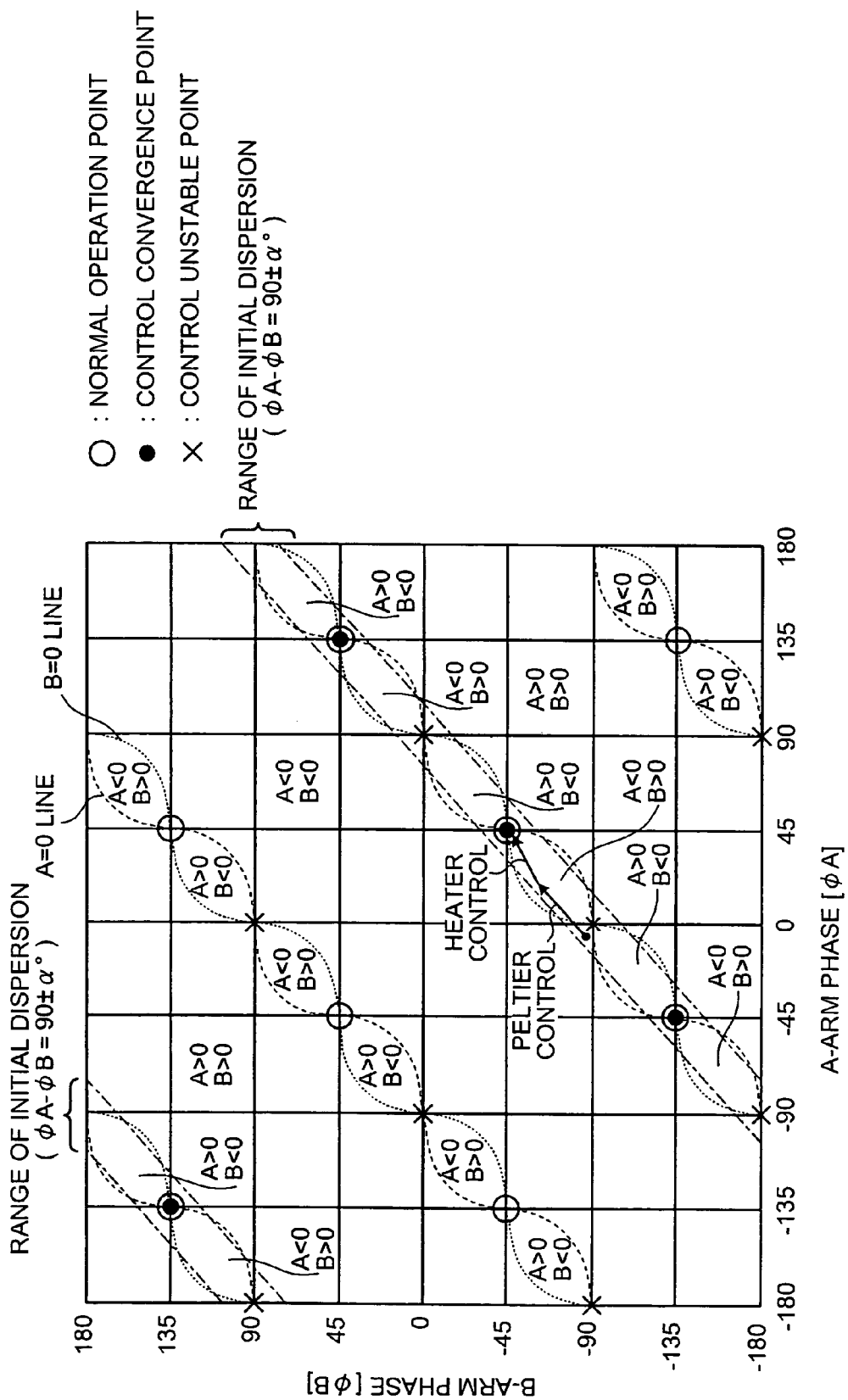
FIG. 9 is a chart for explaining a relation between temperature of the Peltier device and the heater and phases of the A-arm and the B-arm.

The relation between the temperature control of the first heater 22 and the second heater 23 by the A-arm side micro-controller 53 and the B-arm side micro-controller 54, and the phase control of the A-arm and the B-arm will be described. FIG. 8 is a chart for explaining an example of variation of the phases of the A-arm and the B-arm obtained when the temperature of each of the heaters is changed. Arrows headed to the control convergence points and the control unstable points or arrows headed outwardly from the control convergence points and the control unstable points indicate the direction of variation of the phases shown when the temperature of each of the heaters is changed.

In the example shown in FIG. 8, when the value A of the A-arm monitoring signal is positive, the A-arm side micro-controller 53 controls such that the temperature of the heater 22 on the A-arm side is decreased. Thus, the phase φA is delayed and the value A of the A-arm monitoring signal converges to zero. When the value A of the A-arm monitoring signal is negative, the A-arm side micro-controller 53 controls such that the temperature of the heater 22 on the A-arm side is increased. Thus, the phase φA is advanced and the value A of the A-arm monitoring signal converges to zero.

When the value B of the B-arm monitoring signal is positive, the B-arm side micro-controller 54 controls such that the temperature of the heater 23 on the B-arm side is increased. Thus, the phase φB is advanced and the value B of the B-arm monitoring signal converges to zero. When the value B of the B-arm monitoring signal is negative, the B-arm side micro-controller 54 controls such that the temperature of the heater 23 on the B-arm side is decreased. Thus, the phase φB is delayed and the value B of the B-arm monitoring signal converges to zero.

The phase φA of the A-arm and the phase φB of the B-arm are caused to converge on a control convergence point by controlling the temperature of the Peltier device 21, the temperature of the heater 22 on the A-arm side, and the temperature of the heater 23 on the B-arm side. At this time, as described above, the phase φA of the A-arm and the phase φB of the B-arm are shifted to the vicinity of a control convergence point (coarse adjustment) by controlling first the temperature of the Peltier device 21 as show in FIG. 9 from "the relation between the temperature control of the Peltier device and phase control" and "the relation between the temperature control of the heaters and the phase control".

After the coarse adjustment, the phase φA of the A-arm and the phase φB of the B-arm are caused to converge on the control convergence point (fine adjustment) by controlling separately the heater 22 on the A-arm side and the heater 23 on the B-arm side feedback-controlling the temperature of the PLC 20 by the Peltier device 21, the temperature monitor 25, and the temperature control circuit 41. During the fine adjustment, when the driving voltage(s) of either or both of the heaters 22 and 23 is/are close to the upper limit or the lower limit of a pre-determined range within which the voltages are variable, or when the voltage(s) exceed(s) the upper limit or the lower limit thereof, the calculation processing unit 52 again controls the temperature of the Peltier device 21 to cause the driving voltages of the heaters 22 and 23 to remain within the range within which the voltages are variable.

(Temperature Setting Process of Peltier Device During Starting Up)

Figure 10:
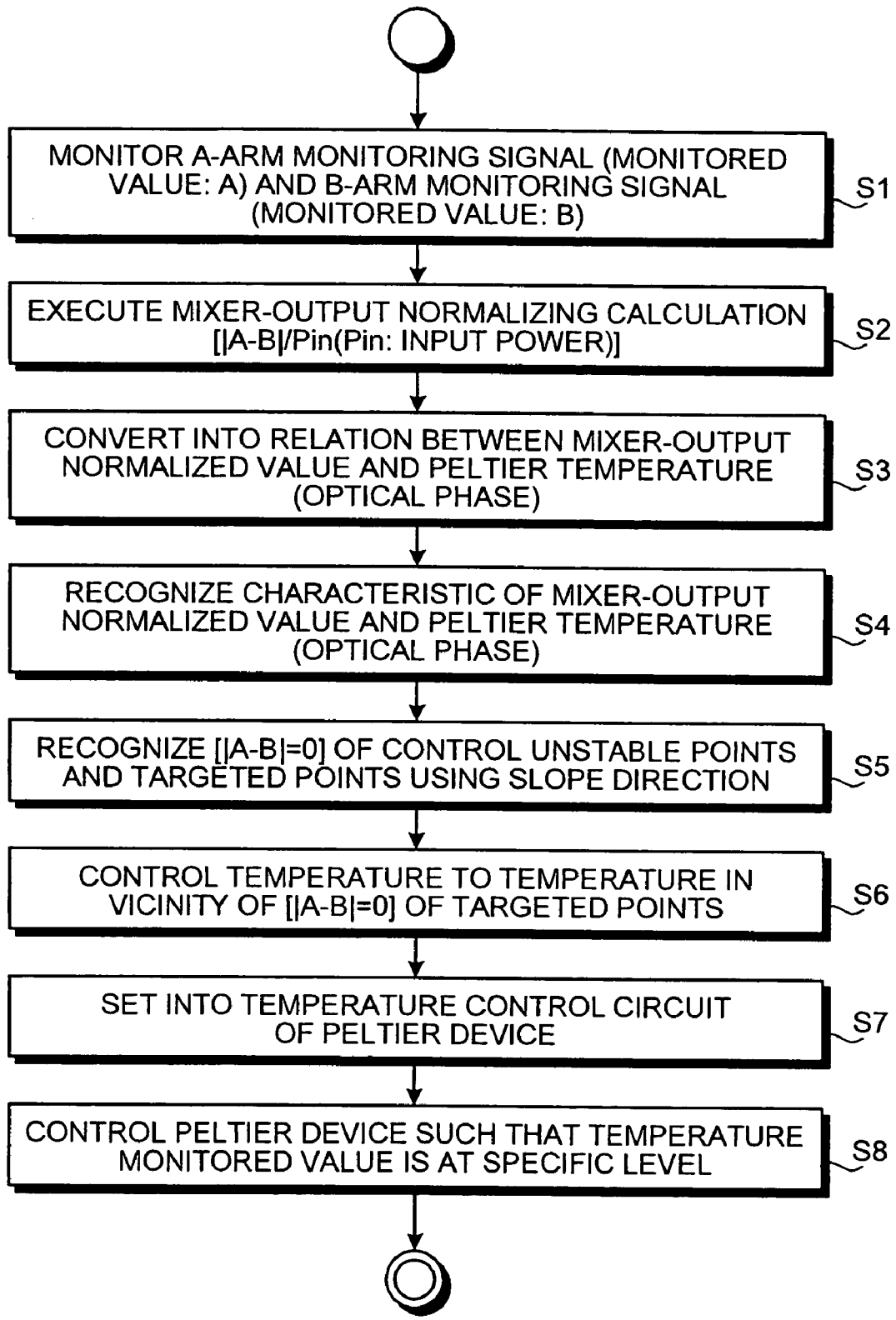
FIG. 10 is a flowchart of a process of setting temperature of the Peltier device during starting up.
Figure 11:
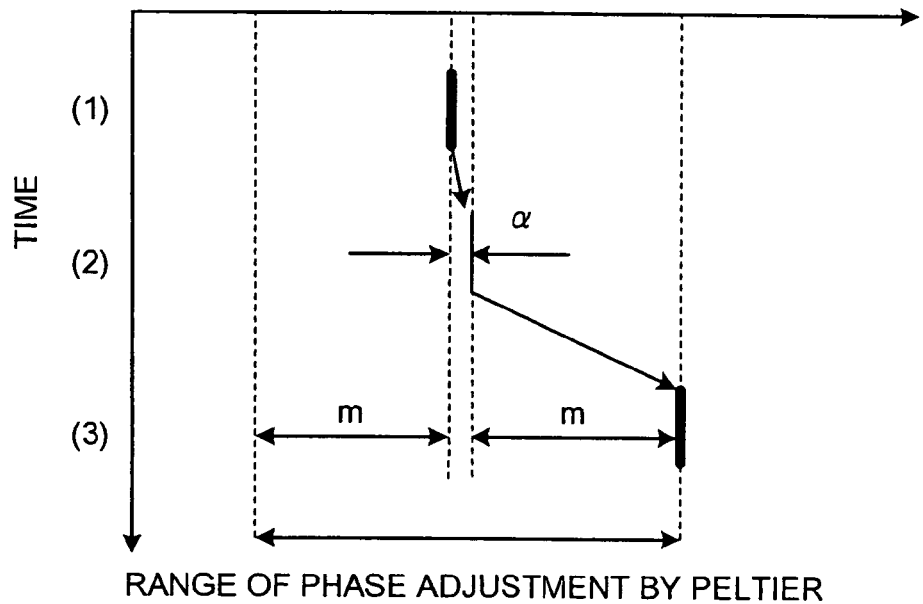
FIG. 11 is an explanatory view for illustrating a range of phase adjustment by the Peltier device.

FIG. 10 is a flowchart of a process of setting the temperature of the Peltier device during the starting up. FIG. 11 illustrates a range of the phase adjustment by the Peltier device. Thick solid lines represent the temperature of the Peltier device 21.

As shown in FIG. 10, during the starting up, the calculation processing unit 52 first obtains the value A of the A-arm monitoring signal and the value B of the B-arm monitoring signal (step S1). The temperature of the Peltier device 21 during the starting up is set close to the center of the range of the phase adjustment by the Peltier device 21 (state (1) in FIG. 11). The calculation processing unit 52 executes mixer-output normalizing calculation and obtains a mixer-output normalized value (step S2). The calculation processing unit 52 converts the mixer-output normalized value into the relation between the mixer-output normalized value and the Peltier temperature (optical phase) (step S3) and recognizes the relation between the mixer-output normalized value and the Peltier temperature (optical phase) (step S4).

The calculation processing unit 52 recognizes control unstable points and targeted control convergence points from the slope of [the waveform of the A-arm monitoring signal– the waveform of the B-arm monitoring signal] (step S5). The calculation processing unit 52 creates a Peltier control signal such that the phase φA and the phase φB are shifted to near the targeted control convergence points (step S6) and set the signal in the temperature control circuit 41 (step S7). The temperature control circuit 41 controls the temperature of the Peltier device 21 to reach the temperature set by the Peltier control signal. At this time, when the phase φA and the phase φB are close to the control unstable points, the temperature of the Peltier device 21 is set again to be higher than before by the amount corresponding to a phase a such that the phase φA and the phase φB are advanced by the phase u with which the phases φA and φB can avoid the control unstable points (state of (2) in FIG. 11).

When the temperature of the Peltier device 21 becomes stable, the temperature control circuit 41 maintains the temperature of the Peltier device 21 to be constant by feedback control by the temperature monitor 25 (step S8). At this time, sufficient phase adjusting margins m are necessary on both sides of the temperature of the Peltier device 21 during the steady operation to be able to follow wavelength fluctuation (approximately 5 Gigahertz (GHz) at the most) and temperature fluctuation during the steady operation (state (3) in FIG. 11). State (3) shown in FIG. 11 indicates a state where the temperature of the Peltier device 21 is varied to the limit of the phase adjusting margins m.

Figure 12:
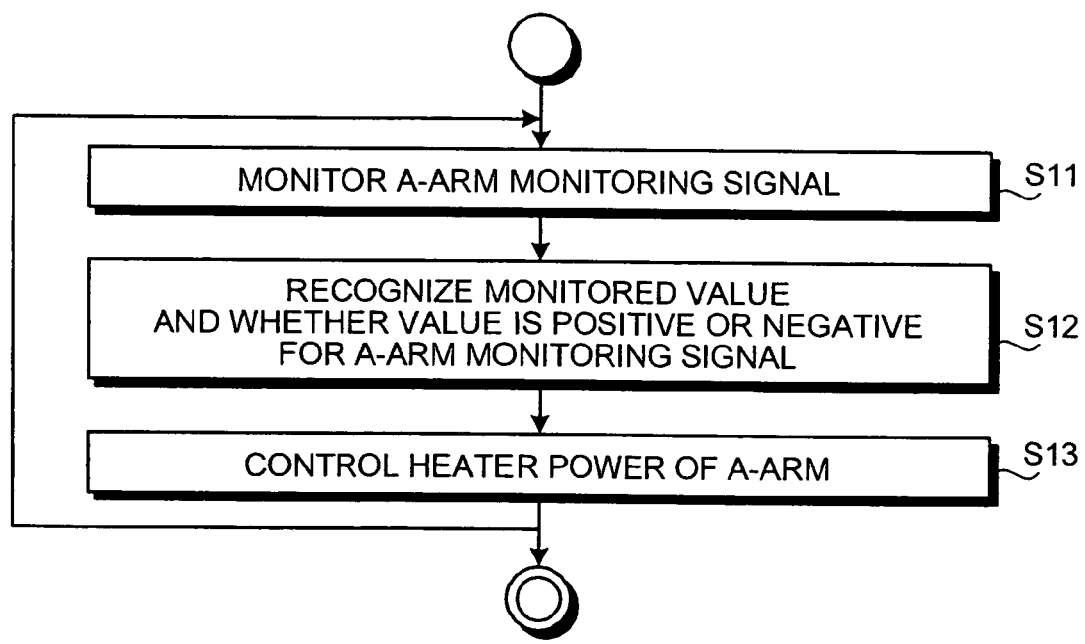
FIG. 12 is a flowchart of a process of setting temperature of the heater on an A-arm side.
Figure 13:
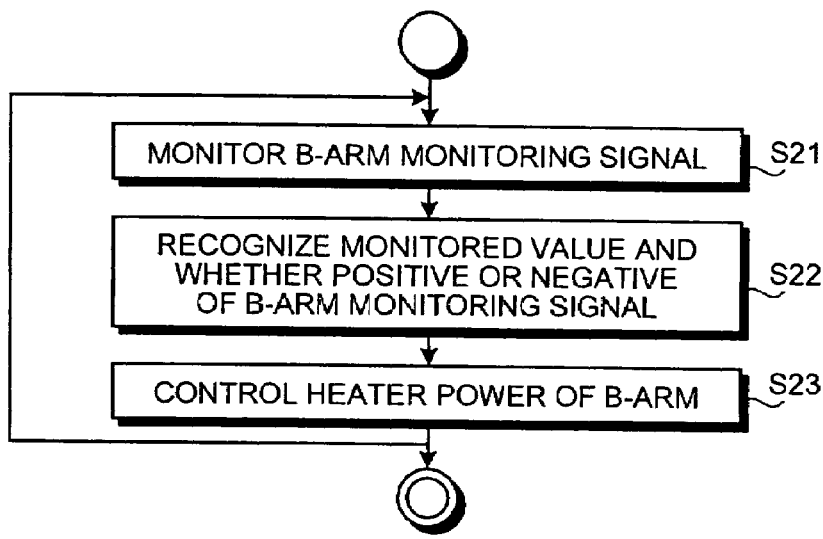
FIG. 13 is a flowchart of a process of setting temperature of the heater on a B-arm side.

FIG. 12 is a flowchart of a process of setting the temperature of the heater on the A-arm side. FIG. 13 is a flowchart of a process of setting the temperature of the heater on the B-arm side.

As shown in FIGS. 12 and 13, the A-arm side micro-controller 53 first obtains the value A of the A-arm monitoring signal (step S11). Similarly, the B-arm side micro-controller 53 obtains the value B of the B-arm monitoring signal (step S21). The A-arm side micro-controller 53 recognizes the value A of the A-arm monitoring signal and whether the value is positive or negative (step S12). Similarly, the B-arm side micro-controller 53 recognizes the value B of the B-arm monitoring signal and whether the value is positive or negative (step S22).

The A-arm side micro-controller 53 controls the power, that is, the temperature of the heater 22 on the A-arm side based on the value A of the A-arm monitoring signal and whether the value is positive or negative (step S13). This step is repeated until the value A of the A-arm monitoring signal becomes zero. Similarly, the B-arm side micro-controller 53 controls the power, that is, the temperature of the heater 23 on the B-arm side based on the value B of the B-arm monitoring signal and whether the value is positive or negative (step S23). This step is repeated until the value B of the B-arm monitoring signal becomes zero.

Figure 14:
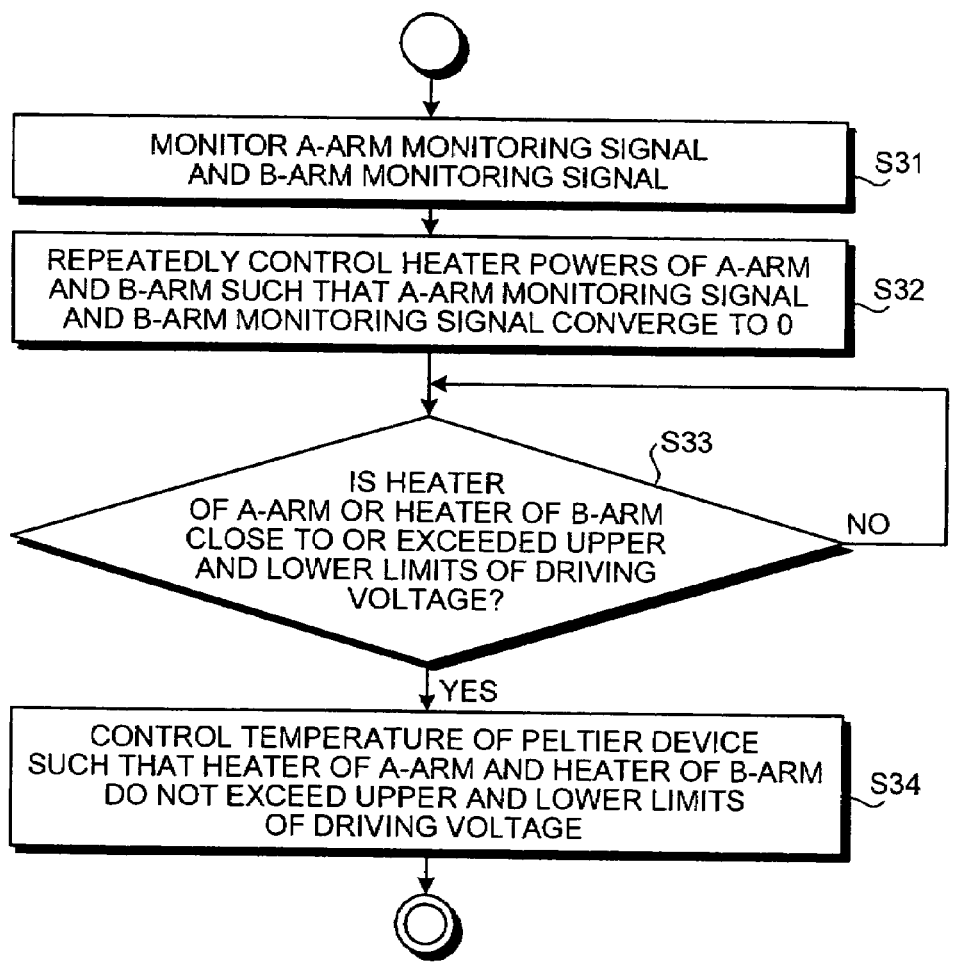
FIG. 14 is a flowchart of a process of setting temperature of the Peltier device during steady operation.
Figure 15:
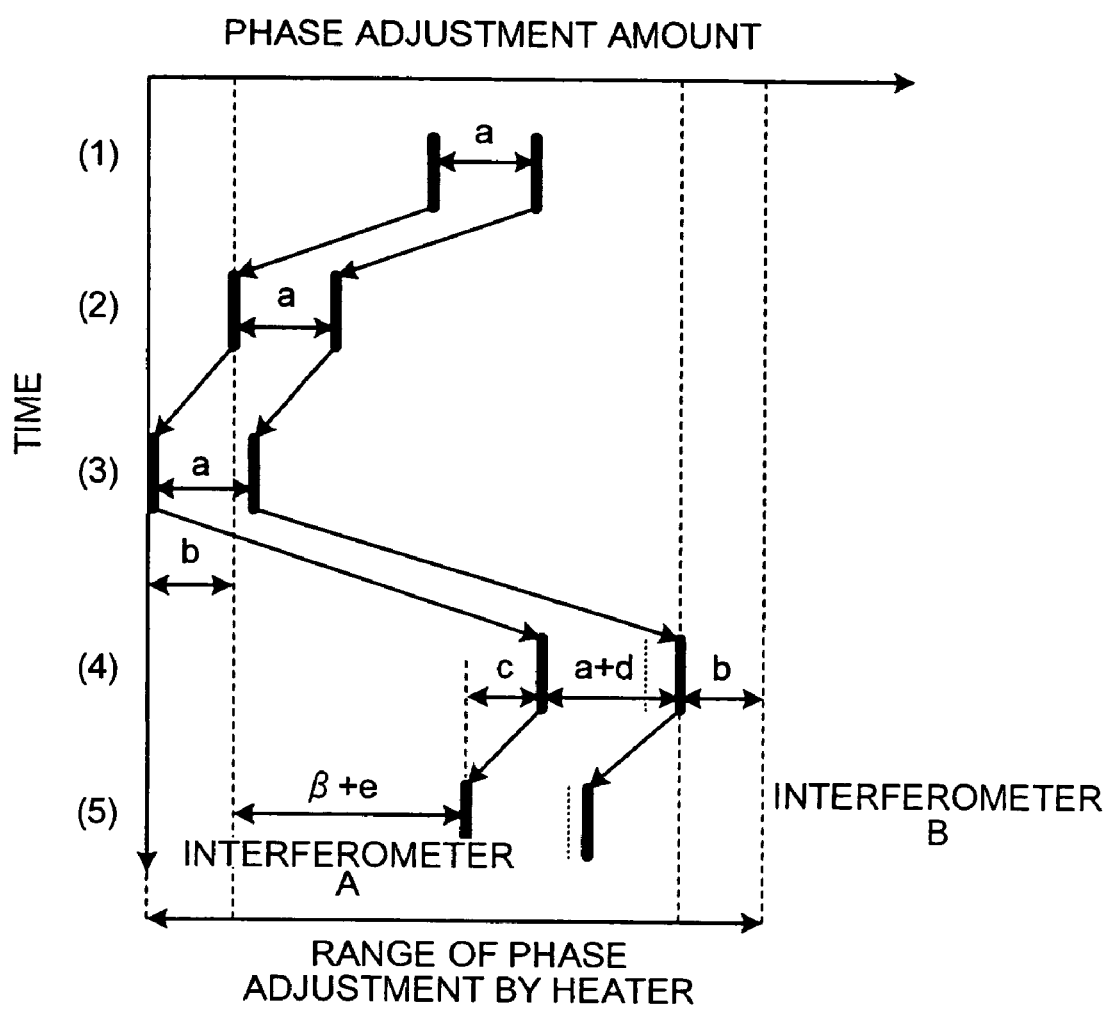
FIG. 15 is an explanatory view for illustrating a range of phase adjustment by the heater.
Figure 16:
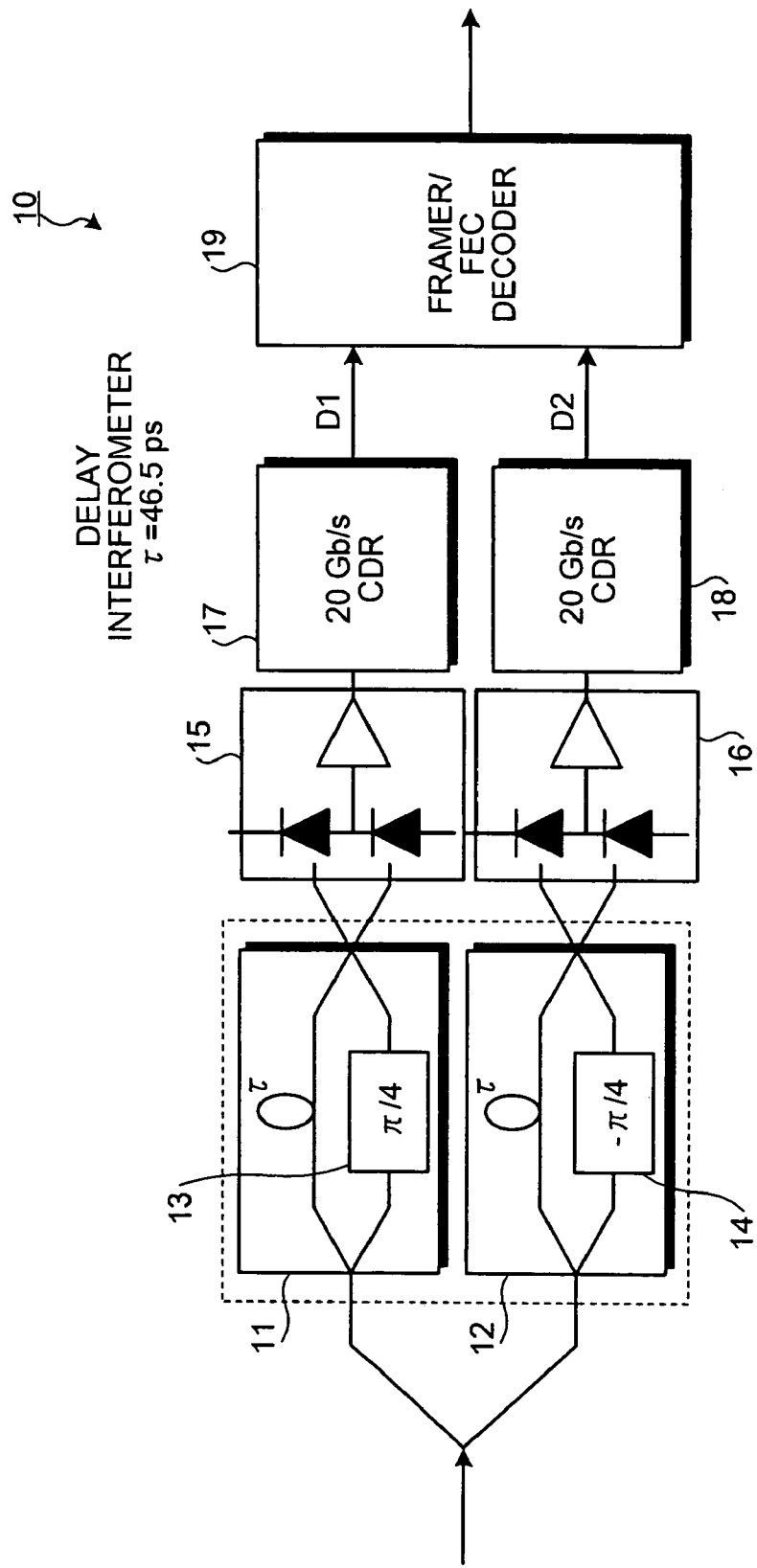
FIG. 16 is a block diagram of a conventional optical DQPSK receiver.

FIG. 14 is a flowchart of a process of setting the temperature of the Peltier device is re-set during the steady operation. FIG. 15 is a chart illustrating a range of the phase adjustment by the heaters. In a pair of thick solid lines shown in each of stages (1) to (5), the solid line on the left represents the driving voltage of the heater 22 on the A-arm side and the solid line on the right represents the driving voltage of the heater 23 on the B-arm side.

As shown in FIG. 14, the A-arm side micro-controller 53 obtains the value A of the A-arm monitoring signal. Similarly, the B-arm side micro-controller 53 obtains the value B of the B-arm monitoring signal (step S31). The A-arm side micro-controller 53 controls repeatedly the power of the heater 22 on the A-arm side such that the value A of the A-arm monitoring signal converges to zero. Similarly, the B-arm side micro-controller 54 controls repeatedly the power of the heater 23 on the B-arm side such that the value B of the B-arm monitoring signal converges to zero (step S32).

Stage (1) shown in FIG. 15 indicates the state at this time and indicates where an amount of displacement (hereinafter, "a") from about 90°(=π/2) that is the phase difference between the phase φA and the phase φB is compensated by the heater 22 and the heater 23. In this state, it is assumed that, for example, the wavelength of a light source on the transmitting side fluctuates. Following this wavelength fluctuation, the phase φA and the phase φB are respectively shifted by the same amount by changing the temperature of each of the heater 22 on the A-arm side and the heater 23 on the B-arm side by the same amount.

At this time, as shown in stage (2) shown in FIG. 15, when the driving voltage(s) of either or both of the heaters 22 and the heater 23 approach (es) the upper limit or the lower limit of a pre-determined range (step S33: YES), the calculation processing unit 52 activates a sequence for re-setting the temperature of the Peltier device 21. Even after the sequence has been activated, when the varying speed of the light source wavelength is higher than the time constant of the temperature control of the PLC 20, the driving voltages of the heaters 22 and 23 temporarily exceed a threshold level to activate the sequence for re-setting the temperature of the Peltier device 21, enter a region of "b" shown in FIG. 15, and further approach the upper limit or the lower limit of the range for the driving voltages to be variable (stage (3) in FIG. 15).

The calculation processing unit 52 again controls the temperature of the Peltier device 21 such that the driving voltages of the heaters 22 and 23 are set within the range for the voltages to be variable of the phase adjustment (step S34). Stage (4) shown in FIG. 15 is an example designed for the temperature of the Peltier device 21 to be re-set by the amount corresponding to the phase difference β. Due to the re-setting of the temperature of the Peltier device 21, the necessary amount of the phase adjustment by the heaters 22 and 23 is changed by the amount of the re-setting. Stage (4) indicates the state where the offset amount from about 90°($=\pi/2$) that is the phase difference between the phase φA and the phase φB has shifted from "a" before the re-setting to [a+b] after the re-setting of the temperature of the Peltier device.

At stage (4), a thick dashed line represents the amount corresponding to the offset amount "a" before the re-setting of the temperature of the Peltier device 21. Because the actual amount of the phase shift due to the variation of the temperature set in the Peltier depends on the heater voltage, strictly speaking, an error is present with respect to β. Therefore, as shown in stage (5) shown in FIG. 15, a margin "e" is estimated for the error to β. At step S33 in FIG. 14, when the driving voltages of the heaters 22 and 23 are not close to or do not exceed the upper limit and the lower limit of the predetermined range (step S33: NO), the temperature of the Peltier device 21 is not changed.

As described above, according to the embodiments, the temperature of the Peltier device 21 is controlled by the calculation processing unit 52 based on the value obtained by subtracting the value B of the B-arm monitoring signal from the value A of the A-arm monitoring signal, the mixer-output normalized value, and the slope of [the waveform of the A-arm monitoring signal–the waveform of the B-arm monitoring signal]; the temperature of the heater 22 on the A-arm side is controlled by the A-arm side micro-controller 53 based on the value A of the A-arm monitoring signal; and the temperature of the heater 23 on the B-arm side is controlled by the B-arm side micro-controller 54 based on the value B of the B-arm monitoring signal; and therefore, the temperature of each of the Peltier device 21 and the two heaters 22 and 23 can be automatically controlled efficiently in a short time. Therefore, during the starting up, the phase difference between the phase φA of the A-arm and the phase φB of the B-arm can be adjusted such that the phase difference can approach $\pi/2$ efficiently in a short time.

According to the embodiments described above, it is possible to efficiently adjust temperature changing units in a short time.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A phase control apparatus comprising:
a first delay interferometer including
 a first optical waveguide;
 a second optical waveguide that propagates an optical signal having a phase difference of approximately $\pi/4$ from a phase of an optical signal that is propagated through the first optical waveguide, wherein
 the first optical waveguide has a length longer than the second optical waveguide by a length that provides a delay time difference corresponding to at least an integral multiple of one symbol of a differential-quadrature-phase-shift-keying (DQPSK) modulating signal, and
 an optical signal input to the first delay interferometer is branched into two to be input to the first optical waveguide and the second optical waveguide;
a second delay interferometer including
 a third optical waveguide;
 a fourth optical waveguide that propagates an optical signal having a phase difference of about $-\pi/4$ from a phase of an optical signal that is propagated through the third optical waveguide, wherein
 the third optical waveguide has a length longer than the fourth optical waveguide by a length that provides a delay time difference corresponding to at least an integral multiple of one symbol of a DQPSK modulating signal, and
 the optical signal input to the second delay interferometer is branched into two to be input to the third optical waveguide and the fourth optical waveguide;
a first photoelectric converting unit that converts the optical signal that propagates through the first optical waveguide and the optical signal that propagates through the second optical waveguide into an electric signal;
a second photoelectric converting unit that converts the optical signal that propagates through the third optical waveguide and the optical signal that propagates through the fourth optical waveguide into an electric signal;
a first data reproducing unit that determines logic of the electric signals produced by the first photoelectric converting unit to reproduce data of the optical signal that propagates through the first delay interferometer;
a second data reproducing unit that determines logic of the electric signals produced by the second photoelectric converting unit to reproduce data of the optical signal that propagates through the second delay interferometer;
a first monitoring signal detecting unit that detects a first monitoring signal formed by multiplying an input signal to the first data reproducing unit and an output signal of the second data reproducing unit;
a second monitoring signal detecting unit that detects a second monitoring signal formed by multiplying an input signal to the second data reproducing unit and an output signal of the first data reproducing unit;
a first temperature changing unit that changes temperature of the first delay interferometer and the second delay interferometer;
a second temperature changing unit that changes temperature of the second optical waveguide;
a third temperature changing unit that changes temperature of the fourth optical waveguide;

a first temperature control unit that controls temperature of the first temperature changing unit based on a value of the first monitoring signal and the second monitoring signal;

a second temperature control unit that controls temperature of the second temperature changing unit based on a value of the first monitoring signal; and a third temperature control unit that controls temperature of the third temperature changing unit based on a value of the second monitoring signal.

2. The phase control apparatus according to claim 1, wherein the first temperature control unit controls the temperature of the first temperature changing unit such that a slope of a waveform obtained by subtracting a waveform of the second monitoring signal from a waveform of the first monitoring signal is negative and a value obtained by subtracting the value of the second monitoring signal from the value of the first monitoring signal is not to be zero or substantially zero.

3. The phase control apparatus according to claim 1, wherein the first temperature control unit controls the temperature of the first temperature changing unit such that the slope of a waveform obtained by subtracting a waveform of the second monitoring signal from a waveform of the first monitoring signal is positive.

4. The phase control apparatus according to claim 3, wherein the first temperature control unit controls the temperature of the first temperature changing unit such that a value obtained by subtracting the value of the second monitoring signal from the value of the first monitoring signal is zero or substantially zero.

5. The phase control apparatus according to claim 1, wherein the second temperature control unit controls the temperature of the second temperature changing unit such that the value of the first monitoring signal is zero.

6. The phase control apparatus according to claim 1, wherein the second temperature control unit controls the temperature of the second temperature changing unit to be decreased when the value of the first monitoring signal is positive and to be increased when the value of the first monitoring signal is negative.

7. The phase control apparatus according to claim 1, wherein the third temperature control unit controls the temperature of the third temperature changing unit such that the value of the second monitoring signal is zero.

8. The phase control apparatus according to claim 1, wherein the second temperature control unit controls the temperature of the third temperature changing unit to be increased when the value of the second monitoring signal is positive and to be decreased when the value of the second monitoring signal is negative.

9. The phase control apparatus according to claim 1, wherein when both the value of the first monitoring signal and the value of the second monitoring signal converge to zero and when at least one of the temperature of the second temperature changing unit and the temperature of the third temperature changing unit exceeds an upper limit and a lower limit of a range within which each temperature is changeable, the first temperature control unit controls the temperature of the first temperature changing unit such that both the temperature of the second temperature changing unit and the temperature of the third temperature changing unit do not exceed the upper limit and the lower limit.

10. The phase control apparatus according to claim 4, wherein the first temperature control unit normalizes the value obtained by subtracting the value of the second monitoring signal from the value of the first monitoring signal, by dividing the obtained value by an input level to any one of the first photoelectric converting unit and the second photoelectric converting unit.

11. The phase control apparatus according to claim 1, wherein the first temperature control unit, the second temperature control unit, and the third temperature control unit independently control the temperature of the first temperature changing unit, the second temperature changing unit, and the third temperature changing unit respectively.

12. The phase control apparatus according to claim 1, wherein the first temperature control unit controls the temperature of the first temperature changing unit using a proportional-integral-derivative control.

13. The phase control apparatus according to claim 1, wherein the second temperature control unit controls the temperature of the second temperature changing unit using a proportional-integral-derivative control.

14. The phase control apparatus according to claim 1, wherein the third temperature control unit controls the temperature of the third temperature changing unit using a proportional-integral-derivative control.

15. An optical DQPSK receiver comprising the phase control apparatus according to claim 1.

* * * * *